(12) United States Patent
Ko

(10) Patent No.: US 7,068,159 B2
(45) Date of Patent: Jun. 27, 2006

(54) REAR LAMP SET WITH BUILT IN SAFETY SENSORS

(76) Inventor: Wen-Shen Ko, No. 6, Lane 83, Sec. 1, Chung Shan North Road, Taipei (TW)

(*) Notice: Subject to any disclaimer, the term of this patent is extended or adjusted under 35 U.S.C. 154(b) by 0 days.

(21) Appl. No.: 10/623,529

(22) Filed: Jul. 22, 2003

(65) Prior Publication Data

US 2004/0201463 A1 Oct. 14, 2004

(30) Foreign Application Priority Data

Apr. 9, 2003 (TW) ............................... 92205570 U

(51) Int. Cl.
*B60Q 1/26* (2006.01)
(52) U.S. Cl. ...................... 340/468; 340/435; 340/937; 340/693.5; 362/545; 362/231
(58) Field of Classification Search ................ 340/468, 340/937, 475, 479, 521, 435, 693.1, 693.5; 362/545, 231, 505, 507, 518, 549, 543, 544
See application file for complete search history.

(56) References Cited

U.S. PATENT DOCUMENTS

| 6,293,686 | B1* | 9/2001 | Hayami et al. | 362/465 |
| 6,349,251 | B1* | 2/2002 | Toda et al. | 701/49 |
| 6,361,196 | B1* | 3/2002 | Boucheron et al. | 362/546 |
| 6,550,949 | B1* | 4/2003 | Bauer et al. | 362/545 |
| 6,774,781 | B1* | 8/2004 | Lee | 340/468 |
| 6,909,376 | B1* | 6/2005 | Rennick | 340/693.6 |

* cited by examiner

Primary Examiner—Anh V. La
(74) Attorney, Agent, or Firm—Troxell Law Office, PLLC

(57) ABSTRACT

The cover lens and the back panel of a rear lamp set are molded to form chambers of predetermined sizes to accommodate safety sensors therein, so that the safety sensors and the rear lamp sets are integrally assembled to a vehicle without spoiling the esthetic appearance of the tail portion of the vehicle. The built in safety sensors, such as cameras, distance detecting devices and sonar sets, help a driver to understand conditions around the tail portion of the vehicle.

7 Claims, 7 Drawing Sheets

REAR LAMP SET WITH BUILT IN SAFETY SENSORS

FIELD OF THE INVENTION

The present invention relates to a rear lamp set with built in safety sensors, and more specifically to a rear lamp set having safety sensors accommodated to simplify the installation of safety sensors in the tail portion of a vehicle, and easily makes the safety sensors an integral part of the vehicle.

BACKGROUND OF THE INVENTION

Generally, as shown in FIGS. 1 and 2, a vehicle 1 has, at the two lateral sides of the tail portion 11, two rear lamp sets 2. A rear lamp set 2 has the configuration varied from one vehicle manufacturer to another, and functionally includes a tail lamp, a stop and tail lamp 21, a turn signal lamp 22, and a back up lamp 23 (see FIG. 2). In some cases, a fog lamp (not shown) is also included.

Rear lamp sets 2 for most vehicles may be classified into two types, namely, one-unit and two-unit types. FIGS. 1 shows a vehicle 1 with one-unit type rear lamp sets 2, and FIG. 2 shows a vehicle 1 having two-unit type rear lamp sets 2. In a one-unit type rear lamp set 2, a tail lamp, a stop and tail lamp, a turn signal lamp, and a back up lamp are integrated into a single unit. In a two-unit type rear lamp set 2, a turn signal lamp 22 and a stop and tail lamp 21 are usually grouped into a unit mounted on the outmost side of the tail portion 11 of a vehicle 1, while a back up lamp 23, a tail lamp, and a fog lamp are combined to form the other unit located at an outer side of the trunk lid 12.

A rear lamp set 2 of both types is always composed of parts, including a cover lens, a back panel, a number of light emitting devices, and a set of wires, sockets, and connectors.

A high mount stop lamp sets 6 is always included in the scope of rear lamp sets 2. A high mount stop lamp set 6 of a vehicle is usually mounted on the upper middle or the bottom middle of the rear windshield 13, or on the trunk lid 12, of the vehicle to provide other drivers with enhanced stop warning signals.

Safety sensors are installed to the tail portion 11 of a vehicle mainly to provide the driver with safety information. Vision and distance images are the most useful safety information for a driver. Currently, safety sensors 3 are installed by fitting into predetermined holes drilled on body parts or the rear bumper 14, or by gluing on with stickers to the tail portion 11, as shown in FIGS. 1 and 2. Either would inevitably spoil the esthetic appearance of the tail portion 11. Moreover, it is uneasy to electrically connect the safety sensors 3 to the power source of the vehicle 1.

There are various types of safety sensors for vision and distance images available, such as CCD (charge coupled device) cameras, distance detecting devices, and sonar sets. These safety sensors help a driver to understand conditions around the tail portion of a vehicle when driving or reversing. For instance, with a camera sensor, a vision image of a small child and obstacles behind the vehicle but out of the sight of the driver could be displayed on a monitor near the driver to avoid collisions. Using a distance-based warning system, different noises representing different distances from the vehicle to an object may help a driver to park the vehicle.

Up to date, those safety sensors are optional. In other words, safety sensors are installed by vehicle dealers or owners after a vehicle is delivered. This also means a lot of works and problems need to be concerned, such as damaged body parts and bumpers, incomplete watertight seal, bare wiring, and the vehicle appearance.

It has been tried to provide a rear bumper with pre-mounted safety sensors, by vehicle manufacturers. However, wiring the safety sensors on the rear bumper to the power source of a vehicle is expensive, time consuming, and troublesome. Although it is necessary to mount safety sensors to the tail portion of a vehicle, there has no ideal, easy, and esthetic way of installation so far.

SUMMARY OF THE INVENTION

A primary object of the present invention is to provide the tail portion of a vehicle with safety sensors, without spoiling the esthetic vehicle appearance. To achieve the object, safety sensors are built into a rear lamp set as a unit. Therefore, the rear lamp set with built in safety sensors may be mounted to the vehicle as a part, providing indicating, warning, and sensing functions.

The back panel and the cover lens of a rear lamp set are molded to preserve chambers to accommodate safety sensors without affecting the indicating and warning functions of the rear lamp set. The safety sensors, built in the chamber of the rear lamp set, may be wired along with the cables and connectors of the lamps.

BRIEF DESCRIPTION OF THE DRAWINGS

The structure and the technical means of the present invention can be best understood by referring to the following drawings and detailed description of the preferred embodiments, wherein.

DETAILED DESCRIPTION OF THE PREFERRED EMBODIMENTS

Figure 1:
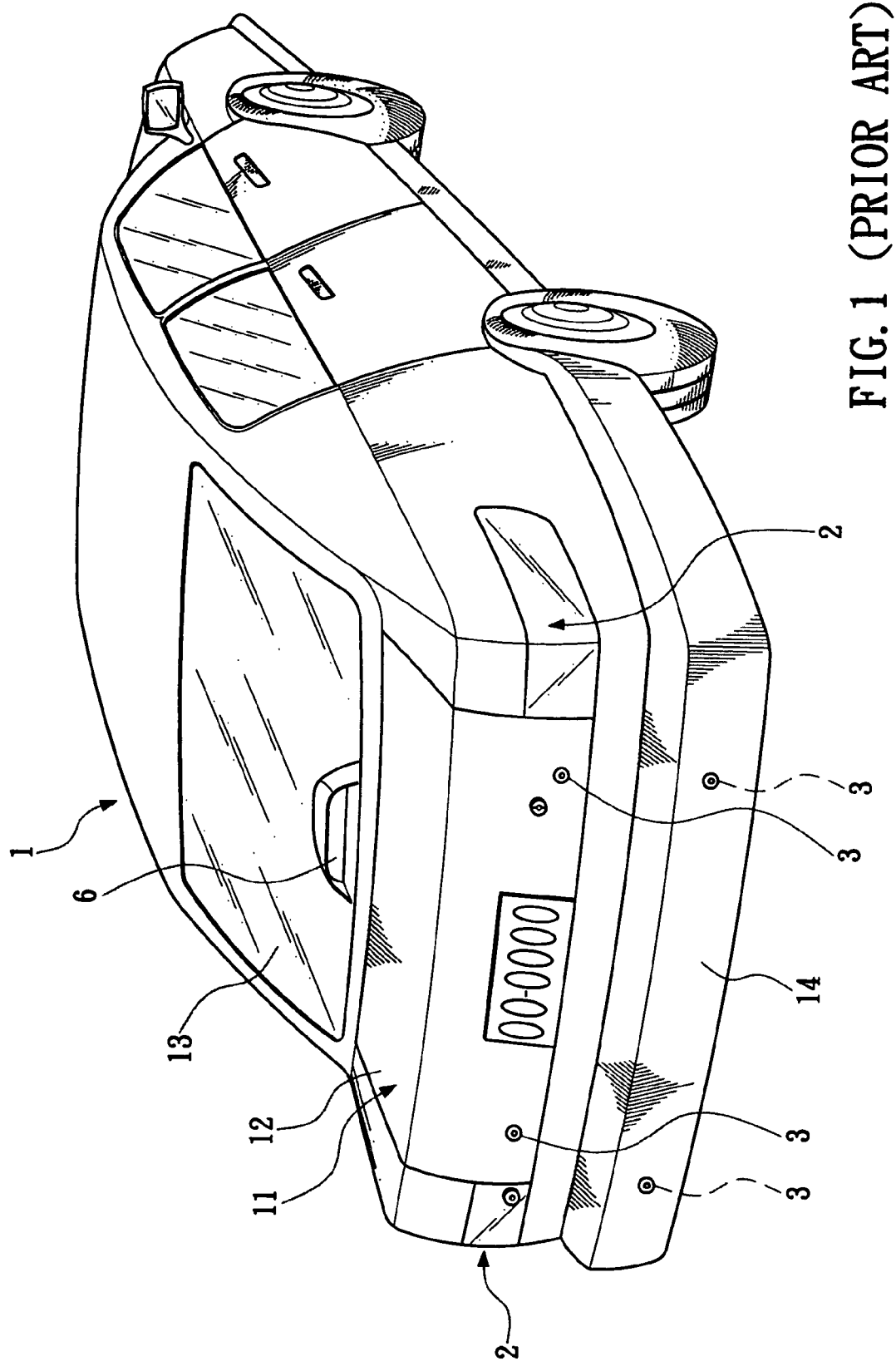
FIG. 1 is a rear perspective view of a vehicle with one-unit type rear lamp sets, having safety sensors mounted in a conventional way.
Figure 2:
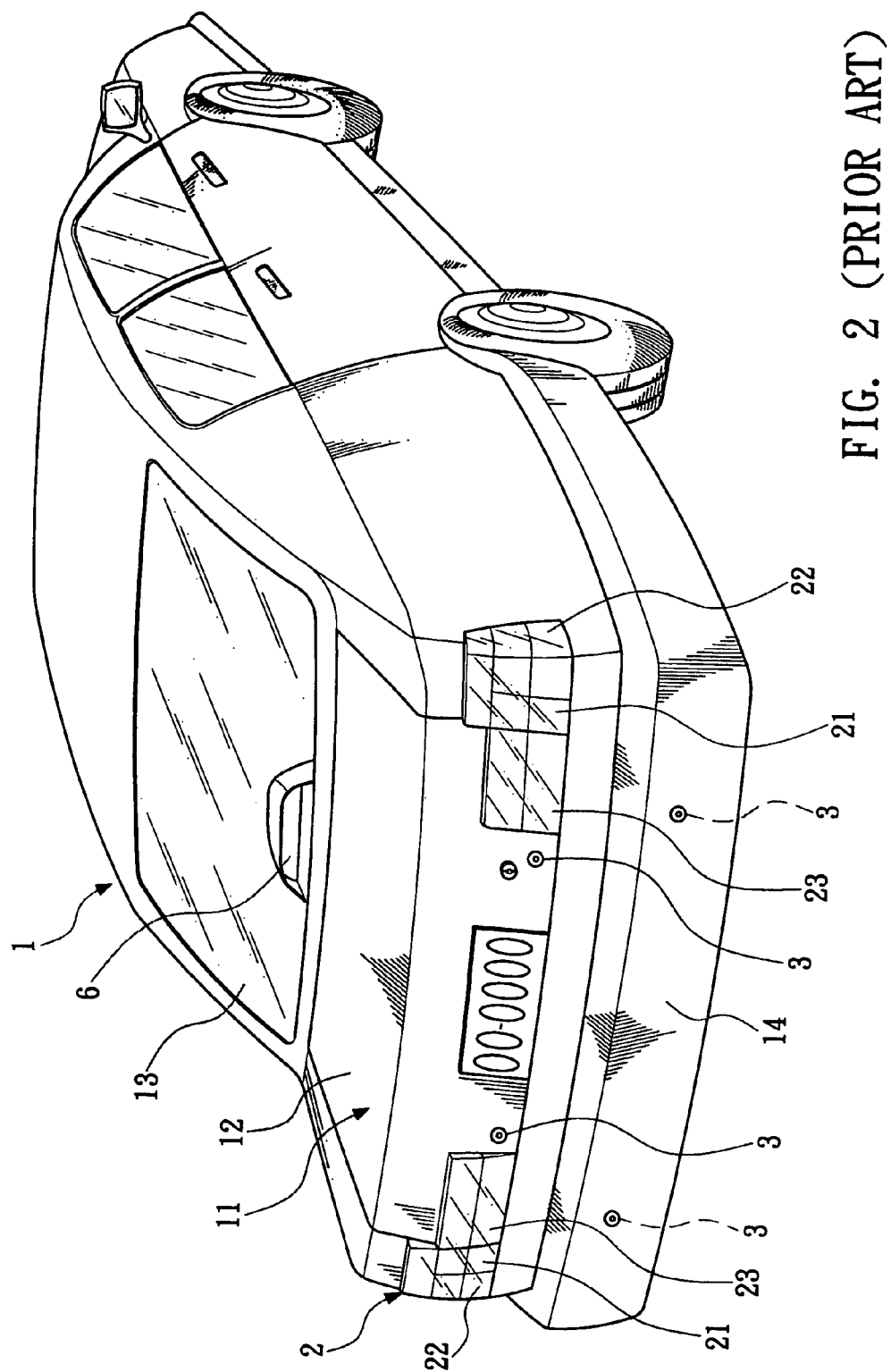
FIG. 2 is a rear perspective view of a vehicle with two-unit type rear lamp sets, having safety sensors mounted in a conventional way.
Figure 3:
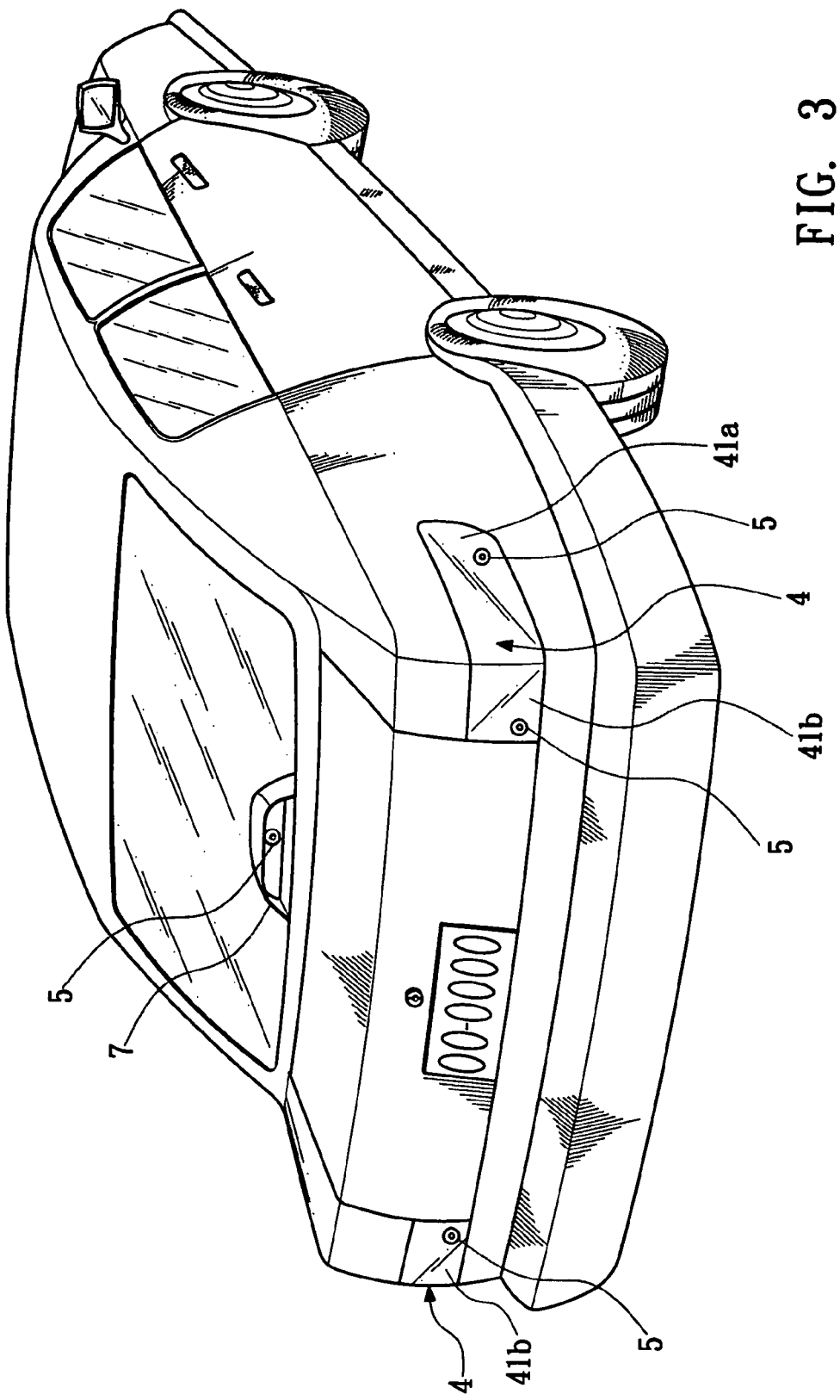
FIG. 3 is a rear perspective view of a vehicle having rear lamp sets of one-unit type with built in safety sensors according to the present invention.
Figure 4:
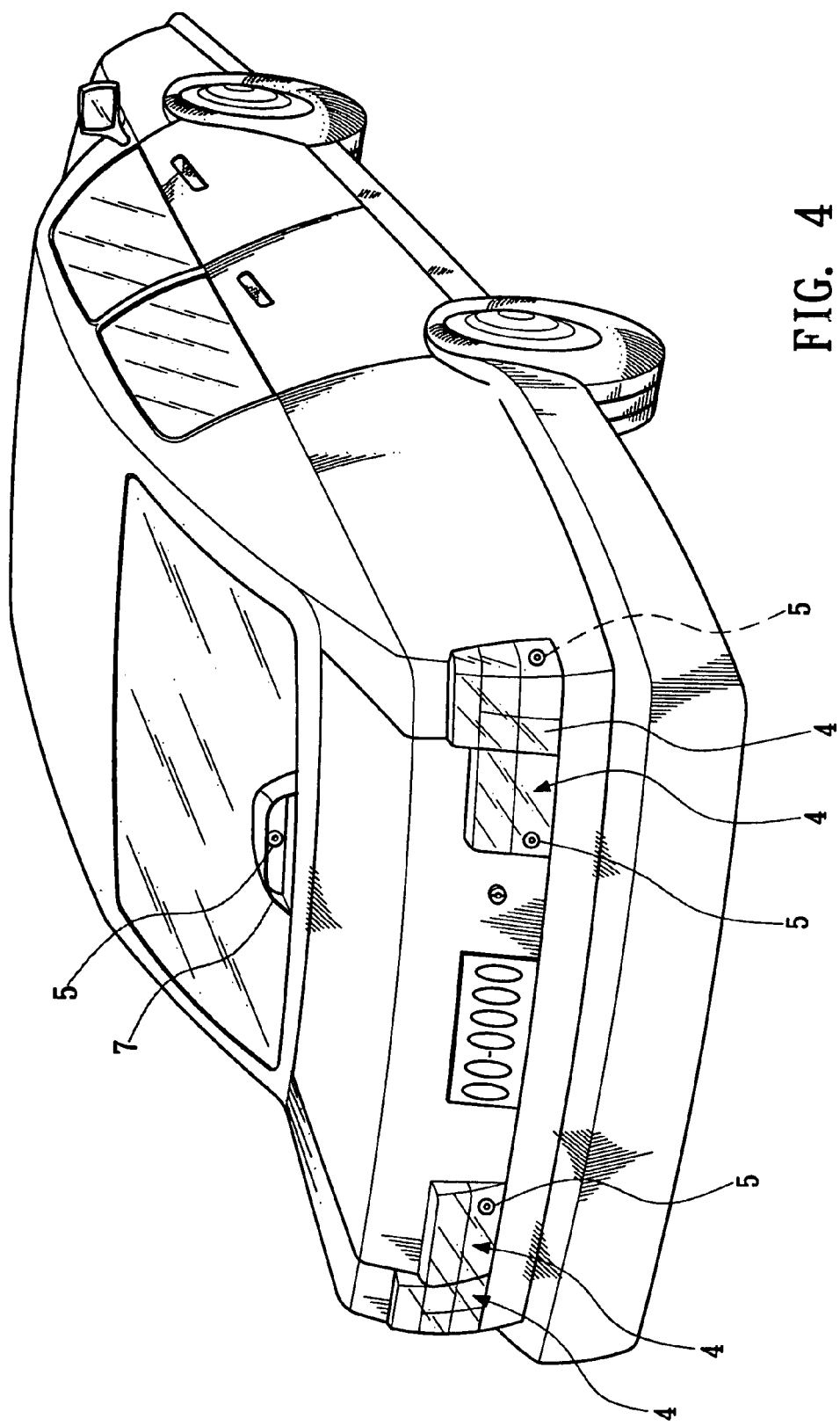
FIG. 4 is a rear perspective view of a vehicle having rear lamp sets of two-unit type with built in safety sensors according to the present invention.

As shown in FIGS. 3, 4, 5, and 6, the present invention describes a rear lamp set with built in safety sensors. At least one safety sensor 5 is integrated into the lamp set 4. The rear lamp set 4 may be of one-unit type as shown in FIG. 3, or two-unit type in FIG. 4. A high mount stop lamp set 7 with built in safety sensors is also described in the invention.

Figure 5:
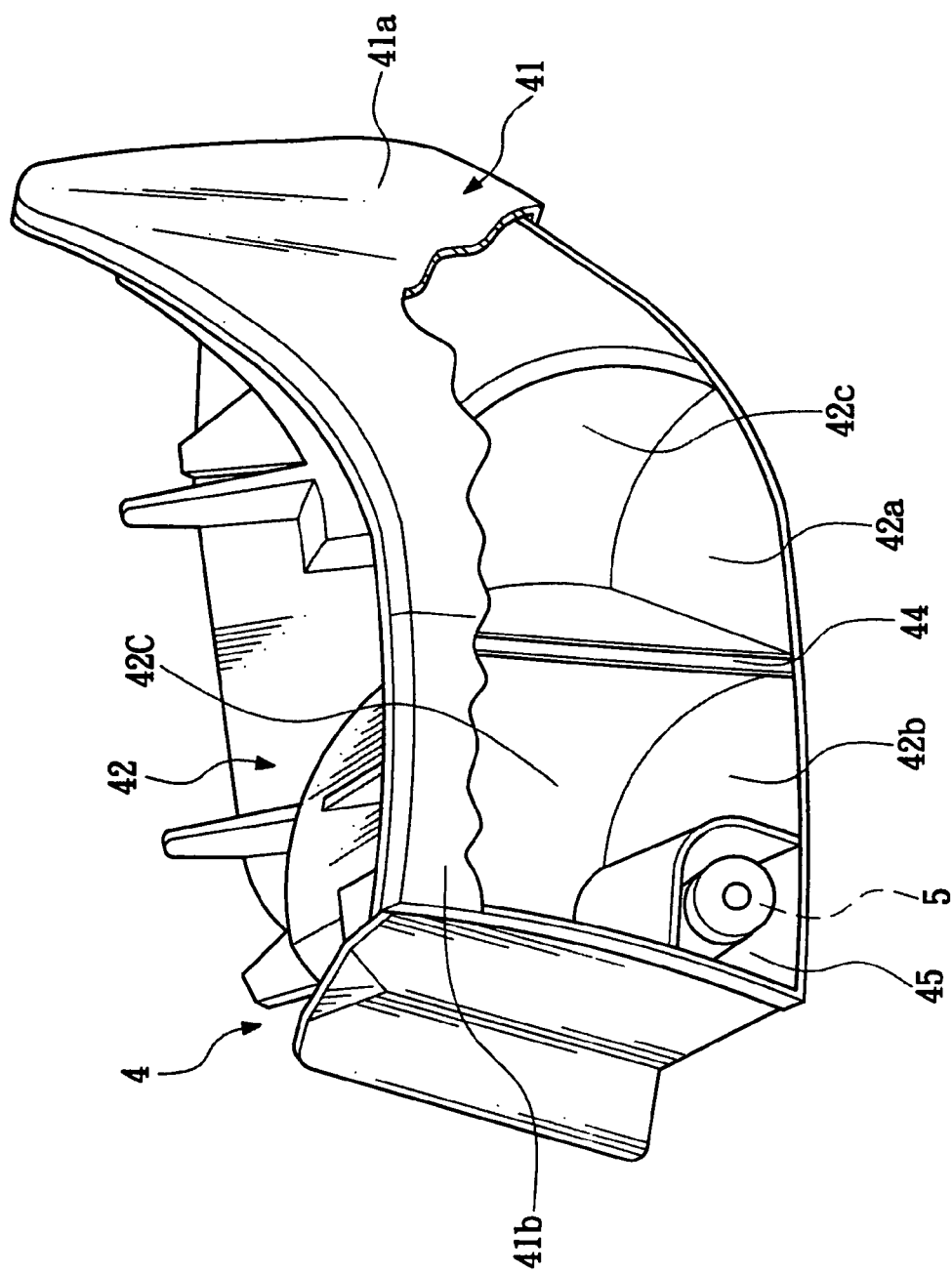
FIG. 5 is a perspective view of a rear lamp set with built in safety sensors according to an embodiment of the present invention, where the cover lens of the rear lamp set is partially cut away to show the internal structure thereof.
Figure 6:
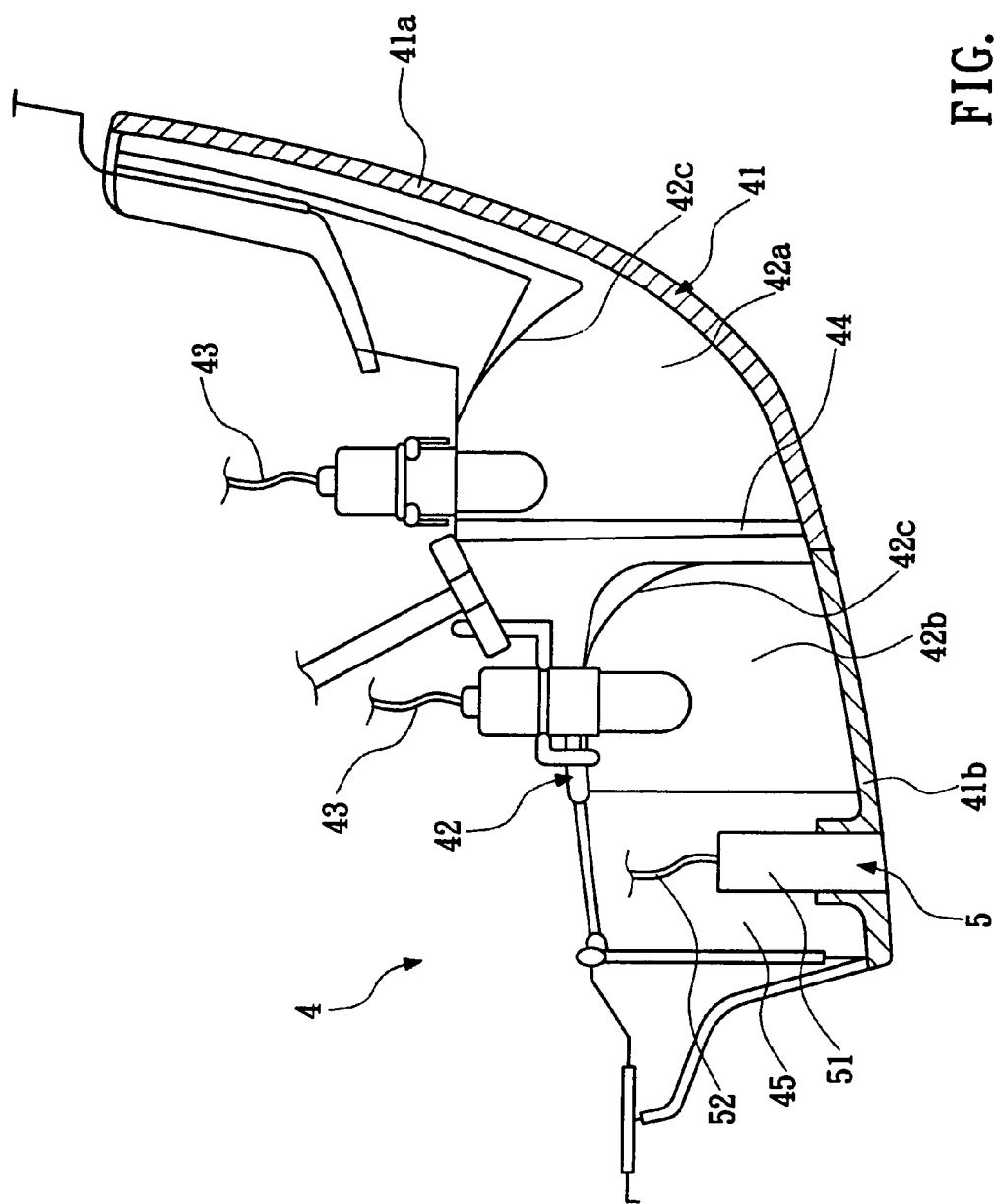
FIG. 6 is a sectioned top view of FIG. 5.

FIGS. 5 and 6 show a partially cutaway perspective view and a sectioned top view, respectively, of a rear lamp set 4 according to the present invention. A rear lamp set 4, of both one-unit type and two-unit type, includes a cover lens 41, a back panel 42 having a predetermined number of sockets and lamps associated therewith, and a full set of wires and connectors 43. The cover lens 41 is divided into several functional areas, such as a turn signal lamp area 41a and a stop and tail lamp area 41b. The back panel 42 includes several compartment chambers 42a and 42b correspondingly associated with the functional areas 41a and 41b of the cover lens 41. A partition board 44 is located between two adjacent compartment chambers 42a and 42b. The compartment chambers 42a and 42b are internally provided with concave mirrors 42c or other optical means to focus and reflect light beams.

A rear lamp set 4 of the present invention is characterized in that at least one separated chamber 45 is produced at a predetermined position of the back panel 42 and the cover lens 41, and the main body 51 of a safety sensor 5 is directly accommodated in the chamber 45 with the sensor head pointing toward the direction of detection. The safety sensor 5 may be a camera or a distance detecting device. The wires and connectors 52 of the safety sensor 5 could be connected to the wires and cables 43 of the rear lamp set 4 to enable the mounting and wiring of the rear lamp set with built in safety sensors to a vehicle at one time. The number of safety sensors 5 built in the rear lamp set 4 depends on the real need.

Figure 7:
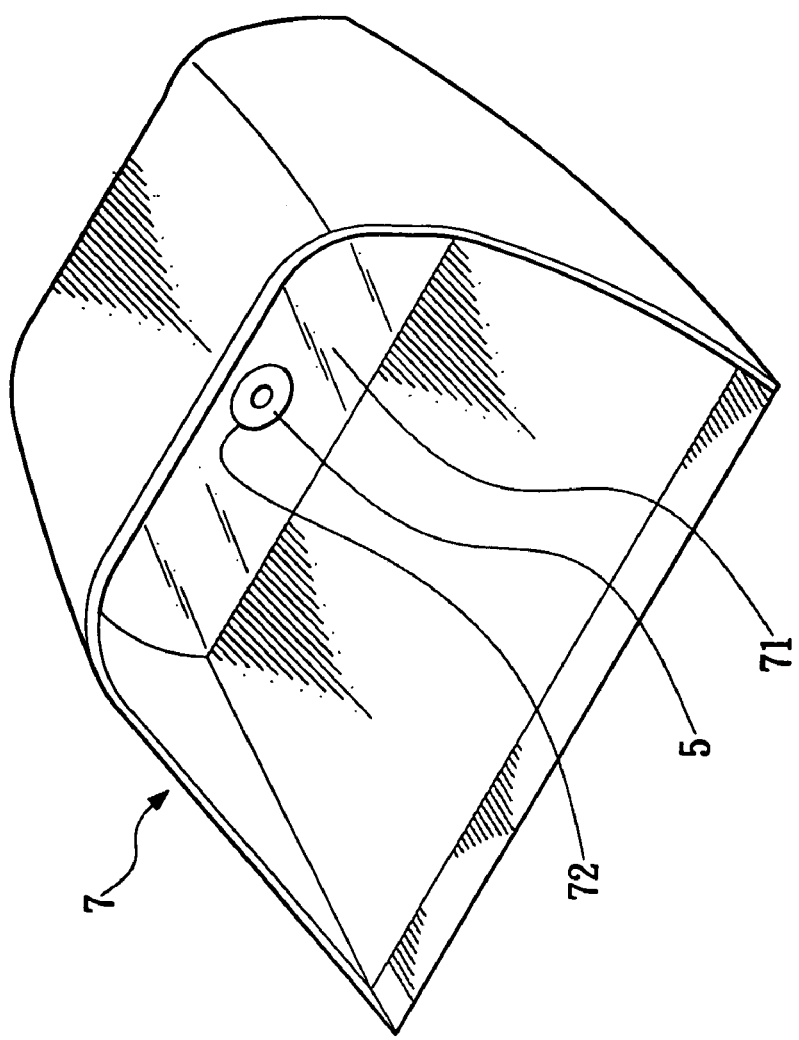
FIG. 7 is a perspective view of a high mount stop lamp set with a built in safety sensor according to another embodiment of the present invention.

As described in FIGS. 3 and 7, a high mount stop lamp set 7 basically has a cover lens 71, a back panel (rot shown), a light-emitting device, and a full set of wires and connectors (not shown). A chamber 72 of a predetermined size is formed on the cover lens 71 and the back panel to accommodate the main body 51 of a safety sensor 5 therein. Again, the safety sensor 5 may be a camera or a distance detecting device. A high mount stop lamp set 7 with built in safety sensors 5 is particularly suitable for a vehicle having no trunk lid 12.

Some advantages of the present invention are listed in the following:
1. A rear lamp set 4 and safety sensors 5 are integrally assembled as a part to simplify the mounting and wiring works to a vehicle.
2. Safety sensors 5 are prevented from easy damage, since they are accommodated in rear lamp sets 4 rather than externally hung on body parts or the rear bumper of a vehicle.
3. Since the mounting and wiring costs can be effectively reduced, a rear lamp set with built in safety sensors according to the present invention may become an origin part of vehicle makers to promote driving safety.
4. The present invention may be implemented to rear lamp sets of any type of vehicles, including cars, wagons, vans, buses, trucks, pick-ups, trailers, etc.

The present invention has been described with a preferred embodiment thereof and it is understood that many changes and modifications in the described embodiment can be carried out without departing from the scope and the spirit of the invention as defined by the appended claims.

What is claimed is:
1. A rear lamp set with built-in safety sensors comprising:
   a) a back panel having:
      i) a plurality of light chambers having a plurality of lamps; and
      ii) at least one safety sensor chamber;
   b) a cover lens covering the back panel and having:
      i) a plurality of lens sections aligning with the plurality of light chambers; and
      ii) at least one safety sensor hole aligning with the at least one safety sensor chamber; and
   c) at least one safety sensor located in the at least one safety sensor chamber and inserted into the at least one safety sensor hole, the at least one safety sensor having an end aligning with an exterior of the lens cover.

2. The rear lamp set according to claim 1, wherein the plurality of lamps are selected from a group of lights consisting of a tail lamp, a stop and tail lamp, a turn signal lamp, a backup lamp, a fog lamp, and any combination thereof.

3. The rear lamp set according to claim 1, wherein each of the back panel and the cover lens are one of a one-piece assembly and a two piece assembly.

4. The rear lamp set according to claim 1, wherein the at least one safety sensor is one of a camera and a distance detecting device.

5. The rear lamp set according to claim 1, wherein the plurality of lamps include a backup lamp, the at least one safety sensor includes a set of connectors and wires electrically connected to and activated by the backup lamp.

6. The rear lamp set according to claim 1, further comprising a high mount stop lamp set having:
   a) a plurality of high mount light-emitting devices located therein;
   b) a high mount back panel having a first safety sensor chamber;
   c) a high mount cover lens having a second safety sensor chamber aligning with the first safety sensor chamber; and
   d) at least one high mount safety sensor is located in the first safety sensor chamber and the second safety sensor chamber.

7. The rear lamp set according to claim 6, wherein the at least one high mount safety sensor is one of a camera and a distance detecting device.

* * * * *